Oct. 15, 1946.     H. C. DRAKE            2,409,554
             FLAW DETECTOR FOR TUBING
         Filed June 16, 1944        2 Sheets-Sheet 1
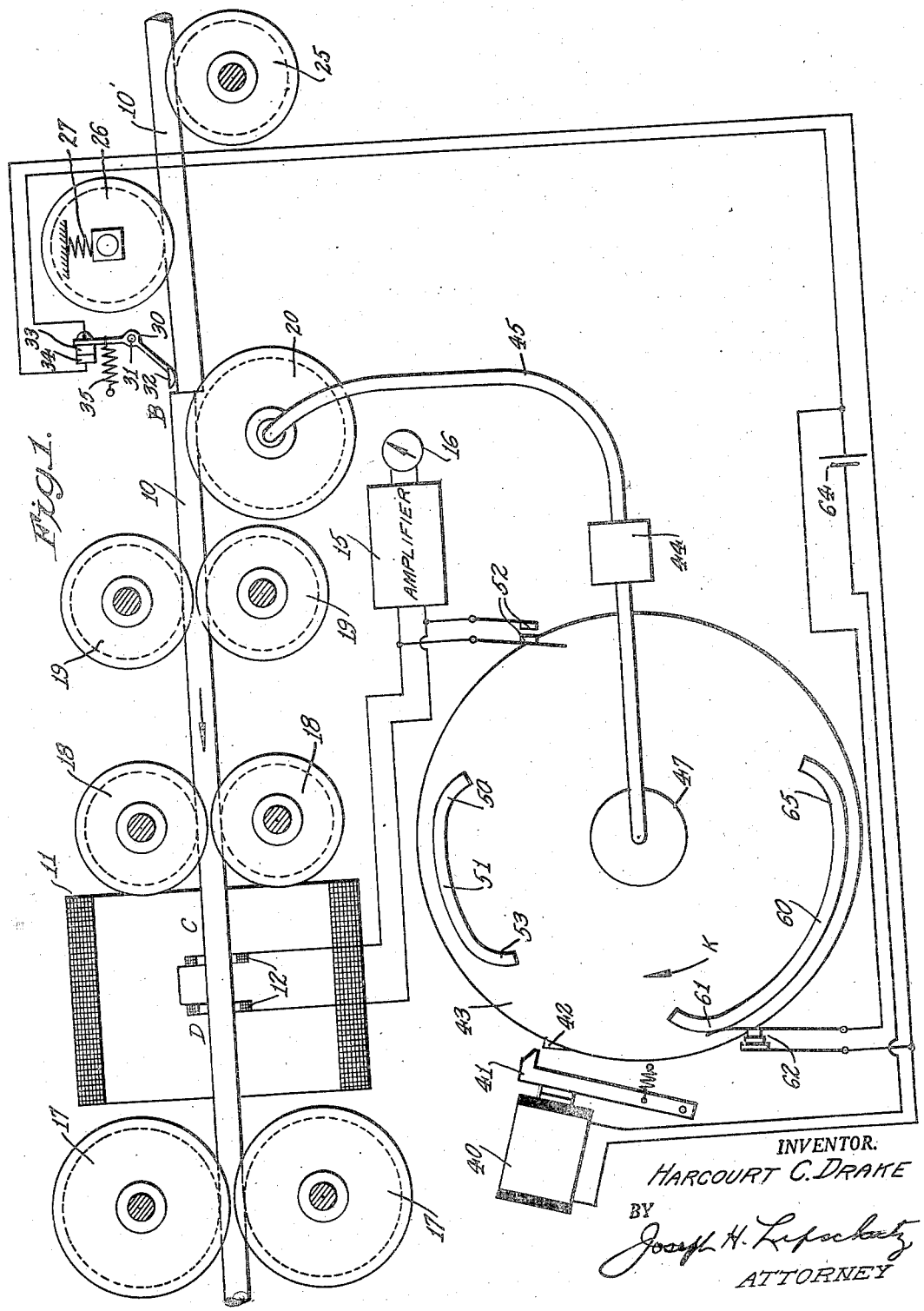
INVENTOR.
HARCOURT C. DRAKE
BY
Joseph H. Lipschutz
ATTORNEY

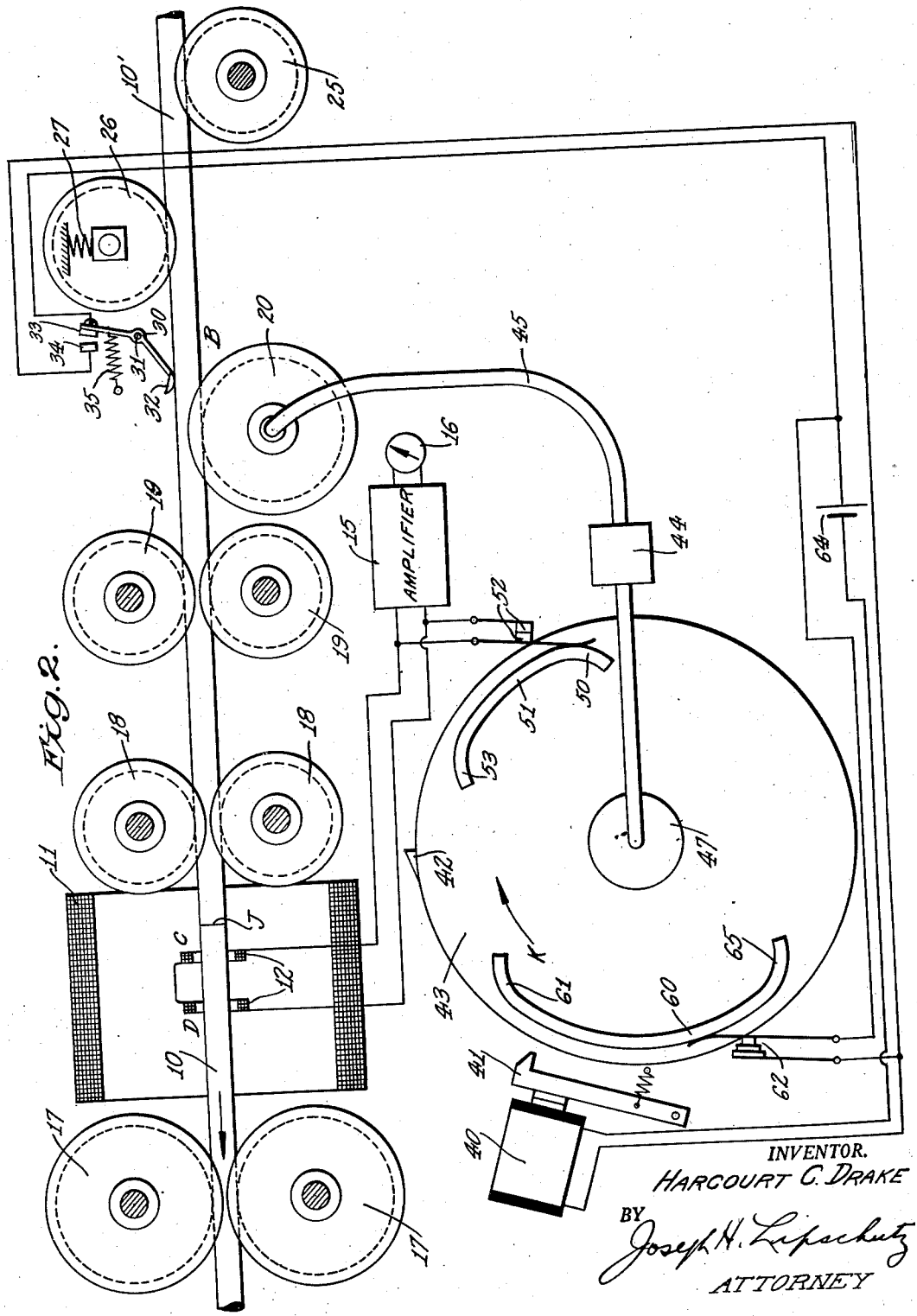

Patented Oct. 15, 1946

2,409,554

UNITED STATES PATENT OFFICE 2,409,554

FLAW DETECTOR FOR TUBING

Harcourt C. Drake, Hempstead, N. Y., assignor to Sperry Products, Inc., Hoboken, N. J., a corporation of New York Application June 16, 1944, Serial No. 540,674

4 Claims. (Cl. 175—183)

This invention relates to flaw detector means for detecting defects in metallic tubing. More particularly the invention relates to the type of tubing tester known as the Sperry detector mechanism wherein the tubing is energized with flux and moved relatively to a pair of detector coils designed to detect regions of non-uniformity in the tubing caused by the presence of fissures or other defects. When a length of tubing is passed through such a detector mechanism, the ends of the tubing cause a large distortion in the flux distribution in the tubing and in the region surrounding the tube so that the detector coils give an indication in the same manner as when a fissure is present. The effect of the distortion caused by the end of the tubing carries over for a considerable length of the tubing and if a true defect occurs within or adjacent to this end distortion, such defect may easily be missed. It is, therefore, desirable that two conditions exist during the testing of tubing, as follows: (1) that the region of distortion be confined to the minimum possible length of tubing, in other words, so that the end effect previously described be held to a minimum, and (2) that the indicating mechanism be rendered ineffective for the interval during which the end effect is present so that if a true defect occurs adjacent this region, it will not be confused with the indication which would otherwise be produced by the end effect.

It is, therefore, the principal object of my invention to accomplish both of the desired results set forth above. I reduce the region of end effect of the tubing by causing the tubes to be fed through the detector mechanism in end to end contact. This has been found to reduce the total end effect to a substantial degree below that which would exist if the tubes were fed in separately in spaced relation. For accomplishing the second object, namely, cutting out the flaw indication during the passage of the tube end past the detector coils, I provide the novel mechanism to be described hereinafter.

Further objects and advantages of this invention will become apparent in the following detailed description thereof.

In the accompanying drawings,

Fig. 1 is a front elevation, largely diagrammatic, and partly sectioned, showing one form of my invention.

Fig. 2 is a view similar to Fig. 1, but showing the parts in a different operative position.

Referring to Fig. 1 of the drawings, there is disclosed a form of Sperry flaw detector for tubing in which a length of tubing 10 to be tested is passed through an energizing coil 11 which is designed to energize the tube 10 with flux to generate eddy currents therein. The currents thus generated will be constant except in the region of flaw where a different amount of eddy currents will be generated. Such variations in induced currents caused by flux may be detected by means such as a pair of opposed induction coils 12 surrounding the tube 10. The coils 12 are of equal inductance and connected in opposition and are normally equally affected, but when a region of flaw occurs, first one and then the other of the coils will have a different E. M. F. induced therein to generate a differential E. M. F. which after being suitably amplified by an amplifier 15 may be caused to operate a suitable indicator shown diagrammatically at 16. The tube 10 may be guided through the energizing coil 11 and detector coils 12 by means of pairs of guide rollers 17, 18, 19 and may be driven by means of a power driven roller 20 which is rotated from a source of power not shown.

As set forth in the introduction hereto, as the end of the tubing 10 approaches the detection coils 12 it is found that the flux distribution in said end is so diffused as to cause a large distortion beginning at a point substantially before the end. This distortion would ordinarily be picked up by the detector coils 12 in the same manner as a fissure or other true defect and would result in a large series of indications on the indicating mechanism 16. If a true defect occurred adjacent this region of end effect, it would be impossible to distinguish it from the indications caused by the end effect. Therefore, as stated in the introduction, it is desirable first that the end effect be held to a minimum and second, that the indicating mechanism be rendered ineffective during the interval that the portion of the tubing subject to end effect is passing the detector coils 12.

For accomplishing the first of these objects, I provide for feeding the tubes through the detector mechanism in end-to-end contact. Thus the forward end of tube 10' is in contact with the rear end of tube 10, forming a closed joint. In this fashion it has been found that the total length of tubing subject to end effect is substantially reduced from that which would result if the tubes were fed through the detector mechanism in spaced relation.

For accomplishing the second of the above objects, namely, to cut out the indicating mechanism, that is, to render it ineffective, during the interval that the ends of the tubes subject to end effect are passing the detector coils 12, I provide novel means for short-circuiting the indicating mechanism during this interval. This novel means insures that the indicating mechanism will be rendered ineffective for only that portion of the tubing subject to end effect and that such operation will be entirely automatic and controlled by the passage of the tubing through the detector mechanism. To accomplish these results, the succeeding tube 10' is fed toward the driving roller 20 by passing it over a guide roller 25 whose upper end is at the same level as the upper end of roller 20 and then passing the tube underneath a roller 26 whose lower end is below the lower ends of upper guide rollers 18 and 19. The result is shown in Fig. 1 wherein the forward end of tube 10' strikes the rear end of tube 10, but is below the level of tube 10. As the tube 10 rides up on power roller 20, it reaches the same level as tube 10 and lifts roller 26 vertically against the action of a spring 27. This difference in level between the incoming and the outgoing tubes is utilized to operate the cutout mechanism for rendering the indicator ineffective for the interval that the ends of the tubes subject to end effect are passing the detector coils 12.

For this purpose, a lever 30 is provided, said lever being pivotally mounted at 31 and carrying at its forward end a slide 32 adapted to slide on the upper surface of the tubes and having at its other end an electric contact 33. The slide 32 normally rides upon the upper surface of tube 10 to maintain contact 33 out of engagement with contact 34. When the slide 32 passes over the rear end of tube 10 and drops down to the lower level of the forward end of tube 10', before the latter rides up on roller 20, the lever 30 is rotated by spring 35 to cause contacts 33 and 34 to close and energize a magnet 40 which then attracts a latch 41 normally in engagement with a lug 42 on a roller 43 which is adapted to be driven from power roller 20 by any suitable means such as flexible drive 45 through reduction gear 44 and a friction clutch 47. Normally the latch 41 engaging the lug 42 prevents rotation of roller 43, the friction clutch 47 merely permitting the parts to slip. However, when contacts 33 and 34 are closed due to slide 32 dropping off the rear end of tube 10, the latch is released and the roller 43 starts to rotate. Since the drive of roller 43 and the feeding of tubes 10 and 10' have definite correlation, means are provided whereby after a certain degree of rotation of roller 43 corresponding to the movement of the rear end of tube 10 from position B to position C, the indicator will be rendered ineffective. Position C represents the point where the end effect of the tube 10 begins to introduce a distortion in the detector coils 12 while position D represents the point where such distortion ends. Therefore, it is desired to render the indicator ineffective for the interval that the rear end of tube 10 and forward end of tube 10' move from position C to position D.

When the joint between tubes 10 and 10' starts moving from position B, the roller 43 begins to rotate and the gear ratio is such that when the joint J between said tubes reaches position C the forward end 50 of a cam 51 engages a set of normally open contacts 52 to close said contacts and short circuit the input to amplifier 15 and hence to render the indicator 16 ineffective. The length of cam 51 is such that the rear end 53 thereof will pass contacts 52 and permit the same to open when joint J has reached position D.

As described hereinbefore, the magnet 40 is energized when slide 32 drops from the rear end of tube 10 to the forward end of tube 10' which is at a lower level. However, tube 10' soon rides up on roller 20 to the same level as tube 10, thus, again opening contacts 33 and 34. This would normally de-energize magnet 40 and cause latch 41 to engage the surface of roller 43. Because the time interval during which contacts 33 and 34 are closed is very short, it is possible for latch 41 to drop and engage lug 42 before the roller 43 has rotated sufficiently to prevent such engagement. This is not desirable and therefore a second cam 60 is provided on the roller 43 with its leading edge 61 so positioned that a set of contacts 62 is closed as soon as roller 43 starts to rotate. This set of contacts closes a holding circuit through magnet 40, said circuit including the battery 64 so that even when contacts 33 and 34 open, magnet 40 remains energized until the rear end 65 of cam 60 passes beyond contacts 62 to permit said contacts to open. This releases the latch 41 which is then in position to engage lug 42 when the roller 43 completes a revolution.

In accordance with the provisions of the patent statues, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaw detector mechanism for tubing, said mechanism comprising means for energizing the tube with flux, means responsive to variations in flux in the tube, and indicating means adopted to be actuated by variations in the responsive means, the ends of the tube causing flux variations similar to those caused by a flaw, means for moving the tubes through the detector mechanism with the ends of adjacent tubes in contact to form a closed joint whereby the region of end effect is reduced, means for rendering the indicating means ineffective during the passage of said joint past the flaw responsive means, means for maintaining the adjacent end of one of the tubes at a joint initially out of alignment, means for moving said last-named end into alignment, and means actuated by said last-named end when moving into alignment for rendering effective the means for rendering the indicating means ineffective during the passage of the joint past the flaw responsive means.

2. In a flaw detector mechanism for tubing, said mechanism comprising means for energizing the tube with flux, means responsive to variations in flux in the tube, and indicating means adapted to be actuated by variations in the responsive means, the ends of the tube causing flux variations similar to those caused by a flaw, means for moving the tubes through the detector mechanism with the ends of adjacent tubes in contact to form a closed joint whereby the region of end effect is reduced, means for rendering the indicating means ineffective during the passage of said joint past the flaw responsive means, said last-named means comprising rotatable means normally held against rotation, means for maintaining the adjacent end of one of the tubes at a joint initially out of alignment, means for moving said last-named end into alignment, and means actuated by said last-named end when moving into alignment for setting said rotatable means into rotation.

3. In a flaw detector mechanism for tubing, said mechanism comprising means for energizing the tube with flux, means responsive to variations in flux in the tube, and indicating means adapted to be actuated by variations in the responsive means, the ends of the tube causing flux variations similar to those caused by a flaw, means for moving the tubes through the detector mechanism with the ends of adjacent tubes in contact to form a closed joint whereby the region of end effect is reduced, means for rendering the indicating means ineffective during the passage of said joint past the flaw responsive means, means for maintaining the adjacent end of one of the tubes at a joint initially out of alignment, means for moving said last-named end into alignment, and means actuated by said last-named end when moving into alignment for rendering effective the means for rendering the indicating means ineffective, and means for maintaining effective the means for rendering the indicating means ineffective after the restoration of said last-named end to alignment and until said joint has passed beyond the flaw responsive means.

4. In a flaw detector mechanism for tubing, said mechanism comprising means for energizing the tube with flux, means responsive to variations in flux in the tube, and indicating means adapted to be actuated by variations in the responsive means, the ends of the tube causing flux variations similar to those caused by a flaw, means for moving the tubes through the detector mechanism with the ends of adjacent tubes in contact to form a closed joint whereby the region of end effect is reduced, means for rendering the indicating means ineffective during the passage of said joint past the flaw responsive means, said last-named means comprising rotatable means normally held against rotation, means for maintaining the adjacent end of one of the tubes at a joint initially out of alignment, means for moving said last-named end into alignment, means actuated by said end when moving into alignment for setting said rotatable means into rotation, and means for continuing the rotation of said rotatable means after the restoration of said last-named end to alignment and until said joint has passed beyond the flaw responsive means.

HARCOURT C. DRAKE.